United States Patent [19]

Delfs

[11] Patent Number: 4,473,327
[45] Date of Patent: Sep. 25, 1984

[54] APPARATUS FOR INJECTING PULVERULENT MATERIAL

[75] Inventor: Hans-Jürgen. Delfs, Hamburg, Fed. Rep. of Germany

[73] Assignee: IBAU Hamburg Ingenieurgesellschaft Industriebau mbH, Hamburg, Fed. Rep. of Germany

[21] Appl. No.: 329,041

[22] Filed: Dec. 9, 1981

[30] Foreign Application Priority Data

Jan. 2, 1981 [DE] Fed. Rep. of Germany ....... 3100050

[51] Int. Cl.³ .............................................. B65G 53/48
[52] U.S. Cl. ................................................... 406/60
[58] Field of Search ...................... 406/60, 61; 414/218

[56] References Cited

U.S. PATENT DOCUMENTS 2,290,809 7/1942 Morrow ................................ 406/60
4,138,162 2/1979 Noren .................................. 406/61

FOREIGN PATENT DOCUMENTS 1249763 9/1967 Fed. Rep. of Germany .
2507687 9/1976 Fed. Rep. of Germany ........ 406/60

Primary Examiner—Jeffrey V. Nase
Attorney, Agent, or Firm—Staas & Halsey

[57] ABSTRACT

Apparatus for injecting pulverulent material into a conveying pipe 12 under a higher pressure by means of a worm 2 mounted in overhead manner in a casing, which conveys against a check valve. Between the worm and check valve 14 is provided a chamber 11 which widens in the conveying direction, which on the one hand prevents any clogging of the conveyed material due to a wedging action in the conveying direction and on the other hand ensures that in the case of a stoppage 4 when an inadequate amount of material is supplied a seal is formed in said area because in the widening chamber 11 the material to be conveyed is compressed and forced back counter to the conveying direction. Inter alia the apparatus can be used for conveying cement. The invention is illustrated most clearly by FIG. 1.

10 Claims, 4 Drawing Figures

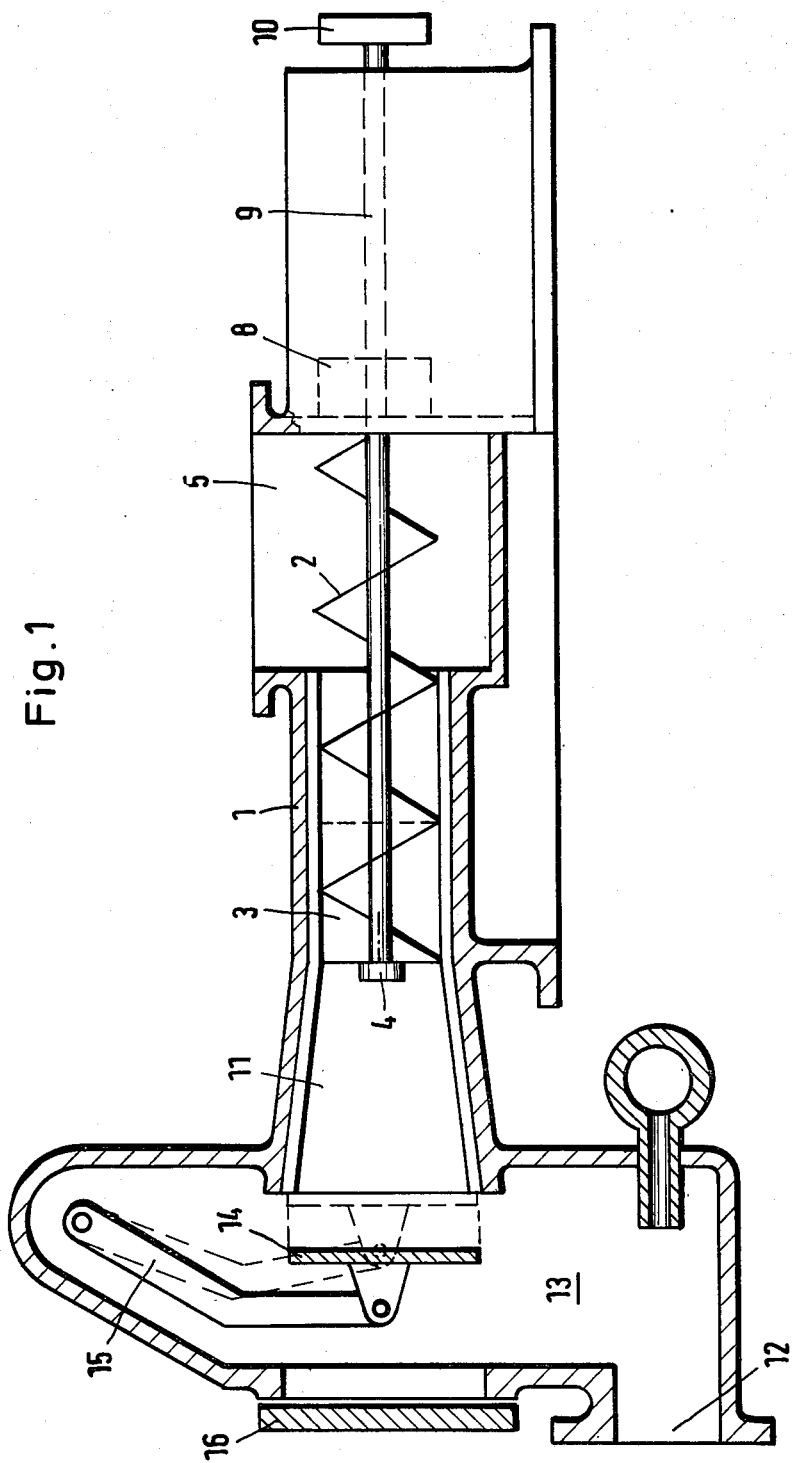

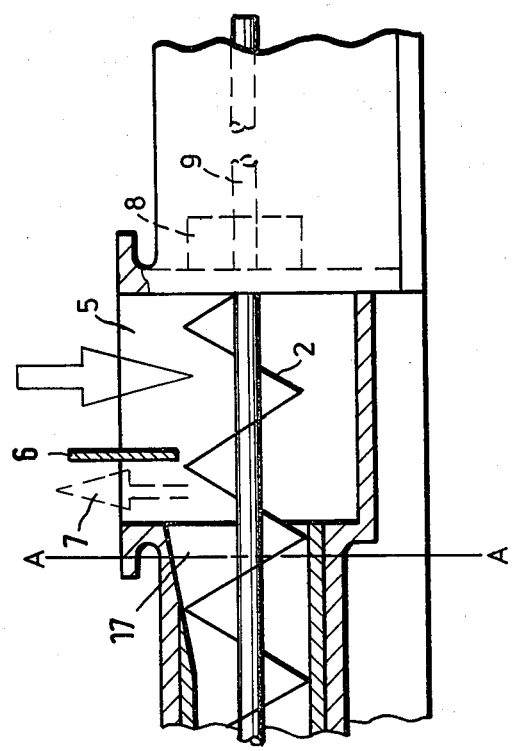
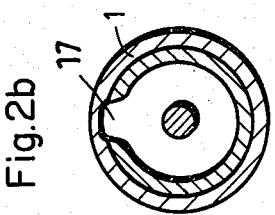
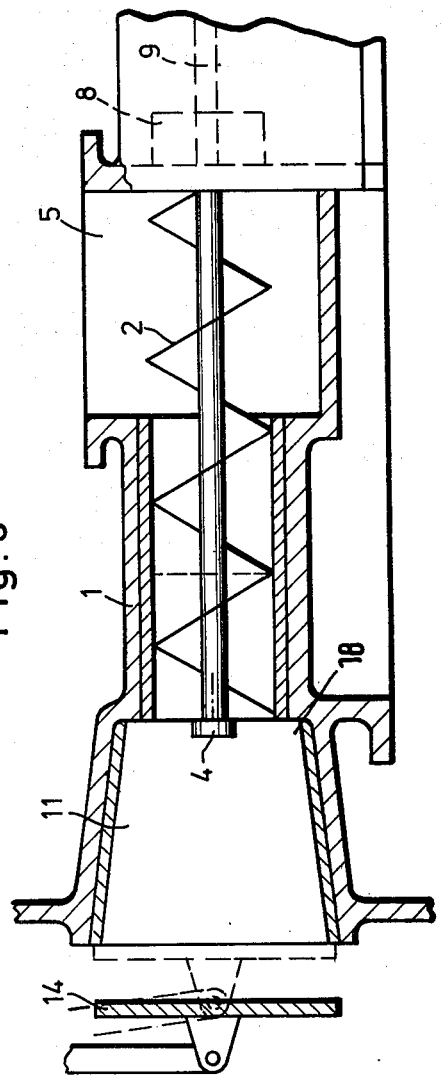

APPARATUS FOR INJECTING PULVERULENT MATERIAL

BACKGROUND OF THE INVENTION

The invention relates to an apparatus for injecting or feeding pulverulent or dry pulverized material into a conveying or feed pipe under an overpressure by an overhead-mounted worm, or screw whose worm casing is extended beyond the end of the worm, to a check valve positioned at the start of the conveying or feed pipe.

German Pat. No. 25 07 687 relates to an apparatus of the aforementioned type and describes in detail the problem occurring with such apparatus. The length of the portion of the worm casing, which projects beyond the worm in the direction of the check valve is very critical in narrow limits in order to form a material plug of the correct length, which ensures an adequate seal, but requires the minimum additional energy. In order to be able to adjust the length of this portion within narrow limits in such a way that the material plug has the corresponding desired length, German Pat. No. 25 07 687 proposed placing rings of varying thickness in front of the check valve for extending the worm casing and as a result it is possible to adjust the corresponding portion of said casing.

In another known apparatus, namely a concrete pump, it has already been proposed to provide a conically widening accumulation portion following the worm. In the case of such so-called concrete pumps the seal is not as critical as in the apparatus of the aforementioned type, because the material only has to be conveyed against a relatively low overpressure determined by the conveying air introduced following the accumulation portion.

BRIEF SUMMARY OF THE INVENTION

The problem of the present invention is to provide an apparatus of the aforementioned type, which does not have to be constantly reequipped for adapting to different materials and operating states, which ensures a reliable seal and simultaneously requires minimum energy for driving the worm and is consequently subject to limited wear.

This problem is solved in that the extension of the worm casing is constructed as a chamber which widens in the conveying direction.

As a result of the fact that a widening (advantageously conically widening) chamber is placed between the worm and the check valve not only is an adequate space provided for collecting sealing material (preventing an air return stroke) but, as a result of its widening in the conveying direction, said space is also constructed in such a way that in the conveying direction a wedging action of the material conveyed is prevented and in the opposite direction a wedging action is assisted, so that the sealing effect is improved.

In the apparatus according to the invention the seal with respect to the conveying pipe, which is under a high pressure, is brought about by a relatively large (long) plug. Despite this long plug excessive energy consumption is avoided, because in the conveying direction the wedging action occurring in a cylindrical pipe is avoided. The worm is essentially a feed and ventilating apparatus, so that the worm can be made shorter. There is no need for a two-sided mounting of the worm. Therefore the worm has a simple construction and runs quietly.

The plug in the widening chamber according to the invention never becomes empty, because the pressure in the conveying pipe compresses and forces back the plug if no conveyed material is supplied through the worm. Under zero loading conditions a pressure seal is possible.

In addition, the minimum load condition is favourable. There is no need for a stopping box in the pressure chamber, such as is required with a two-sided mounting of the worm. Easy access can be obtained to the worm end, so that this wear-prone part can easily be changed. This accessibility and interchangeability also applies to other parts which are prone to wear. The worm runs quietly, because it is relatively short. There are no bearing problems due to vibrations.

The widened portion can be constructed in the most varied manner, e.g. also by and/or through a shoulder following on the worm. The worm is ventilated during conveying. In order to assist the ventilation, the inlet can be subdivided by a partition, so that extra ventilation is obtained. A ventilating slot can also be provided in the upper area at the inlet in the worm casing.

As the worm is only mounted on one side (at the inlet), it is possible to frontally arrange the check valve at the corresponding end of the widening chamber by means of a bent lever in such a way that there is essentially a parallel opening, i.e. the annular cross-section resulting from the opening of the check valve is of approximately the same size over the entire circumference, so that non-uniform loading is prevented and the material conveyed is discharged in a uniform manner.

BRIEF DESCRIPTION OF THE DRAWINGS

The invention is described in greater detail hereinafter relative to non-limitative embodiments of the invention and the attached drawings, wherein:

FIG. 1 is a longitudinal sectional view of a first embodiment of the apparatus of this invention.

FIG. 2A is a partial longitudinal section view of another embodiment of the apparatus of this invention, specifically illustrating a modification in the inlet to the worm casing.

FIG. 2B is a cross-sectional view of the apparatus of FIG. 2A, taken along line A—A in FIG. 2B.

FIG. 3 is a partial view of another embodiment of the widening chamber.

DETAILED DESCRIPTION OF THE PREFERRED EMBODIMENTS

The apparatus shown in the drawings contains a worm casing 1 in which a worm 2 is rotatably mounted. The discharge end 3 of the worm is interchangeable and a screw 4 is provided for this purpose. Inlet 5 can be subdivided by a partition 6 in order to provide ventilation 7. A stuffing box 8 for the drive shaft 9 seals the worm casing against said area. The drive is designated by 10.

The discharge end of the worm is followed in the present embodiment by a conically widening chamber 11. Chamber 11 issues into a space 13, which forms the connection with the conveying pipe 12 and which receives the check valve 14 with its bent lever 15. Cover 16 essentially serves for fitting and maintainance purposes.

FIGS. 2A and 2B show a ventilating slot 17 in the vicinity of the inlet 5 at the top of the worm casing and this slot ensures better ventilation if this is required.

FIG. 3 shows a chamber 11 having a modified construction with a shoulder 18 adjacent to the worm.

In operation the conveyed material is fed in at 5 and is forced through worm 2 into chamber 11. Accompanied by continuous conveying and supply of material into conveying pipe 12, which is under a higher pressure, the material is conveyed against the check valve 14. In the case of such normal conveying, ventilation takes place by means of the worm and the inlet. Ventilation can be assisted by partition 6 and optionally ventilating slot 17.

If no material is supplied or the worm is stopped, the pressure in the conveying pipe 12 compresses the conveyed material in chamber 11 in the direction of the worm, so that a good and effective seal is obtained, which is however outside the area of action of the worm. If conveying now commences again, the conveyed material in chamber 11 is pressurized in the opposite direction and the normal desired conveying starts without any impediment, because chamber 11 is widened in the conveying direction and consequently no wedging action occurs in said direction.

Check valve 14 is so articulated by bent lever 15 that it opens in a "quasi-parallel" manner, as is indicated by the broken lines. This leads to a uniform annular opening cross-section.

What is claimed is:

1. An apparatus for injecting pulverulent materials into a high pressure conveying pipe comprising:
   (a) conveyor housing having inlet and outlet ends;
   (b) a chamber connected to and extending from the outlet end of the conveyor housing, the chamber widening in the conveying direction for forming an effective pulverulent material sealing plug therein;
   (c) screw conveyor means for feeding and conveying pulverulent material comprising a shaft and threaded portion on the shaft, wherein the screw conveyor means is located in the conveyor housing and terminates at the outlet end of the conveyor housing so that the widening pulverulent material sealing plug chamber is void of the screw conveyor means;
   (d) a pulverulent material conveying pipe under a higher pressure than the conveyor housing and connected to the outlet end of the widening pulverulent material sealing chamber; and
   (e) check valve means for stabilizing the pulverulent material sealing plug in and controlling the flow of pulverulent material from the widening material sealing chamber, the check valve means closing the outlet end of the extended widened chamber when there is no pulverulent material in the area of the screw and preventing pulverulent material in the extended widened chamber from running out due to gravity acting on the pulverulent material in the widened chamber and the check valve means opening in response to the particular amount of pulverulent material being conveyed by the screw to the extended widened chamber, whereby the widening chamber and check valve means provide a stabilized effective pulverulent material seal to prevent air blow-back under all pulverulent material feeding conditions.

2. An apparatus according to claim 1, wherein the chamber conically widens.

3. An apparatus according to claim 2, wherein the chamber has a shoulder formed between the inlet end of the widening chamber and the outlet end of the conveyor housing for assuring an effective pulverulent material seal plug in the widening chamber.

4. An apparatus according to claim 3, wherein a partition is positioned in the inlet end of the conveyor housing for dividing the inlet end and for providing ventilation as the pulverulent material is fed into the conveyor housing for forming ventilation is provided at the inlet to the worm-drive material conveyor means.

5. An apparatus according to claim 4, wherein a ventilating slot is provided in the inside of the conveyor housing adjacent the inlet end for ventilation as the pulverulent material is fed into the conveyor housing.

6. An apparatus according to claim 1, wherein the end of the screw conveyor means is interchangeable.

7. An apparatus according to claim 1, wherein the check valve means is articulated in such a way that it is raised from its seat in an almost parallel manner.

8. An apparatus for injecting pulverulent materials into a high pressure conveying pipe comprising:
   (a) conveyor housing having inlet and outlet ends;
   (b) a chamber connected to and extending from the outlet end of the conveyor housing, the chamber widening in the conveying direction for forming an effective pulverulent material sealing plug therein and having a shoulder formed between the inlet end of the widening chamber and the outlet end of the conveyor housing for assuring an effective pulverulent material seal plug in the widening chamber;
   (c) screw conveyor means for feeding and conveying pulverulent material comprising a shaft and threaded portion on the shaft, wherein the screw conveyor means is located in the conveyor housing and terminates at the outlet end of the conveyor housing so that the widening pulverulent material sealing plug chamber is void of the screw conveyor means;
   (d) a pulverulent material conveying pipe under a high pressure than the conveyor housing and connected to the outlet end of the widening pulverulent material sealing chamber; and
   (e) check valve means for stabilizing the pulverulent material sealing plug in and controlling the flow of pulverulent material from the widening material sealing chamber, the check valve means closing the outlet end of the extended widened chamber when there is no pulverulent material in the area of the screw and preventing pulverulent material in the extended widened chamber from running out due to gravity acting on the pulverulent material in the widened chamber and the check valve means opening in response to the particular amount of pulverulent material being conveyed by the screw to the extended widened chamber, whereby the widening chamber and check valve means provide a stabilized effective pulverulent material seal to prevent air blow-back under all pulverulent material feeding conditions.

9. An apparatus for injecting pulverulent materials into a high pressure conveying pipe comprising:
   (a) conveyor housing having inlet and outlet ends and a partition positioned in the inlet end of the conveyor housing for dividing the inlet end and for providing ventilation as the pulverulent material is fed into the conveyor housing;

(b) a chamber connected to and extending from the outlet end of the conveyor housing, the chamber widening in the conveying direction for forming an effective pulverulent material sealing plug therein;

(c) screw conveyor means for feeding and conveying pulverulent material comprising a shaft and threaded portion on the shaft, wherein the screw conveyor means is located in the conveyor housing and terminates at the outlet end of the conveyor housing so that the widening pulverulent material sealing plug chamber is void of the screw conveyor means;

(d) a pulverulent material conveying pipe under a high pressure than the conveyor housing and connected to the outlet end of the widening pulverulent material sealing chamber; and (e) check valve means for stabilizing the pulverulent material sealing plug in and controlling the flow of pulverulent material from the widening material sealing chamber, the check valve means closing the outlet end of the extended widened chamber when there is no pulverulent material in the area of the screw and preventing pulverulent material in the extended widened chamber from running out due to gravity acting on the pulverulent material in the widened chamber and the check valve means opening in response to the particular amount of pulverulent material being conveyed by the screw to the extended widened chamber, whereby the widening chamber and check valve means provide a stabilized effective pulverulent material seal to prevent air blow-back under all pulverulent material feeding conditions.

10. An apparatus for injecting pulverulent materials into a high pressure conveying pipe comprising:

(a) conveyor housing having inlet and outlet ends and a ventilating slot provided in the inside of the conveyor housing adjacent the inlet end for ventilation as the purverulent material is fed into the conveyor housing;

(b) a chamber connected to and extending from the outlet end of the conveyor housing, the chamber widening in the conveying direction for forming an effective pulverulent material sealing plug therein;

(c) screw conveyor means for feeding and conveying pulverulent material comprising a shaft and threaded portion on the shaft, wherein the screw conveyor means is located in the conveyor housing and terminates at the outlet end of the conveyor housing so that the widening pulverulent material sealing plug chamber is void of the screw conveyor means;

(d) a pulverulent material conveying pipe under a high pressure than the conveyor housing and connected to the outlet end of the widening pulverulent material sealing chamber; and (e) check valve means for stabilizing the pulverulent material sealing plug in and controlling the flow of pulverulent material from the widening material sealing chamber, the check valve means closing the outlet end of the extended widened chamber when there is no pulverulent material in the area of the screw and preventing pulverulent material in the extended widened chamber from running out due to gravity acting on the pulverulent material in the widened chamber and the check valve means opening in response to the particular amount of pulverulent material being conveyed by the screw to the extended widened chamber, whereby the widening chamber and check valve means provide a stabilized effective pulverulent material seal to prevent air blow-back under all pulverulent material feeding conditions.

* * * * *